US011887455B1

(12) United States Patent
Mbagwu

(10) Patent No.: US 11,887,455 B1
(45) Date of Patent: Jan. 30, 2024

(54) SAFE ROOM ASSEMBLY

(71) Applicant: Leonard Mbagwu, Sugarland, TX (US)

(72) Inventor: Leonard Mbagwu, Sugarland, TX (US)

( * ) Notice: Subject to any disclaimer, the term of this patent is extended or adjusted under 35 U.S.C. 154(b) by 0 days.

(21) Appl. No.: 17/944,011

(22) Filed: Sep. 13, 2022

(51) Int. Cl.
*G08B 21/02* (2006.01)

(52) U.S. Cl.
CPC .................................... *G08B 21/02* (2013.01)

(58) Field of Classification Search
CPC .... E04H 9/04; E04H 9/06; E04H 9/08; E04H 9/10; E04H 9/12; E04H 9/14; E04H 9/145; E04H 9/16; G08B 21/00; G08B 21/02; G08B 21/0297; G08B 21/10; G08B 21/18
See application file for complete search history.

(56) References Cited

U.S. PATENT DOCUMENTS

| | | | | |
|---|---|---|---|---|
| 794,084 A * | 7/1905 | Hutto | G01R 1/02 | 324/153 |
| 6,308,466 B1 | 10/2001 | Moriarty | | |
| 6,711,980 B2 | 3/2004 | Kropf | | |
| 7,600,348 B1 | 10/2009 | Kostka | | |
| 9,702,160 B2 | 7/2017 | Wirtz | | |
| D864,418 S | 10/2019 | Brown | | |
| 10,738,459 B2 | 8/2020 | Brown | | |
| 2004/0206015 A1 | 10/2004 | Greenboim | | |
| 2006/0080936 A1* | 4/2006 | Dooley | E04H 9/14 | 52/834 |
| 2010/0061662 A1* | 3/2010 | Hubner | G08B 25/016 | 455/404.1 |
| 2011/0001404 A1* | 1/2011 | Lear | A47B 95/02 | 292/213 |

FOREIGN PATENT DOCUMENTS

| | | | |
|---|---|---|---|
| CN | 2883597 Y | * | 3/2007 |
| JP | 2005120667 A | * | 5/2005 |
| WO | WO2018200900 | | 11/2018 |

OTHER PUBLICATIONS

Neal Rodriguez, How to Build a Panic Room, Jan. 13, 2021 (Year: 2021).*

* cited by examiner

*Primary Examiner* — Brian Wilson

(57) ABSTRACT

A safe room assembly for includes a room in a building that has an entry thereby facilitating an occupant to enter the room. Each of a plurality of walls of the room is comprised of a bullet resistant material to protect the occupant from an active shooter. A viewing element is integrated into the entry to facilitate the occupant to see the active shooter. Furthermore, the viewing element inhibits the active shooter from seeing the occupant through the viewing element. A communication unit is positioned within the room thereby facilitating two way communications between occupant and emergency responders. A weapons locker is positioned in the room for storing weapons thereby facilitating the weapons to be accessible to the occupant.

9 Claims, 6 Drawing Sheets

SAFE ROOM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to safe room devices and more particularly pertains to a new safe room device for protecting an occupant from an active shooter in a building. The device includes a room constructed with bullet resistant walls and a bullet resistant door that locks from the inside. The device includes a bullet resistant, two-way mirror that is integrated into the door and a communication unit that facilitates two-way communication between the occupant and emergency responders. Additionally, the device includes a weapons locker that stores weapons and a pair of defense slots extending through the door to facilitate a weapon to be fired through a respective defense slot.

(2) Description of Related Art Including Information Disclosed Under 37 CFR 1.97 and 1.98

The prior art relates to safe room devices including a portable storm shelter comprising a rigid case with dimensions sufficient to hold an adult and a door for entering the rigid case. The prior art discloses an armored booth that includes a cart being retractably integrated into a bottom, a door for entering the booth and a plurality of openings each integrated into the booth. The prior art discloses a ballistic protection shelter that includes a rigid frame, a soft walled structure supported by the rigid frame and a rigid structure disposed within the soft walled structure. The prior art discloses an above ground storm shelter that includes a set of double doors and a set of door bars that extend across the set of double doors. The prior art discloses a collapsible ballistic shelter. The prior art discloses a modular above ground shelter that includes lifting hooks for craning the modular above ground shelter into position and a walkthrough for attaching a plurality of modular sections together to form a single shelter.

BRIEF SUMMARY OF THE INVENTION

An embodiment of the disclosure meets the needs presented above by generally comprising a room in a building has an entry thereby facilitating an occupant to enter the room. Each of a plurality of walls of the room is comprised of a bullet resistant material to protect the occupant from an active shooter. A viewing element is integrated into the entry to facilitate the occupant to see the active shooter. Furthermore, the viewing element inhibits the active shooter from seeing the occupant through the viewing element. A communication unit is positioned within the room thereby facilitating two way communications between occupant and emergency responders. A weapons locker is positioned in the room for storing weapons thereby facilitating the weapons to be accessible to the occupant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
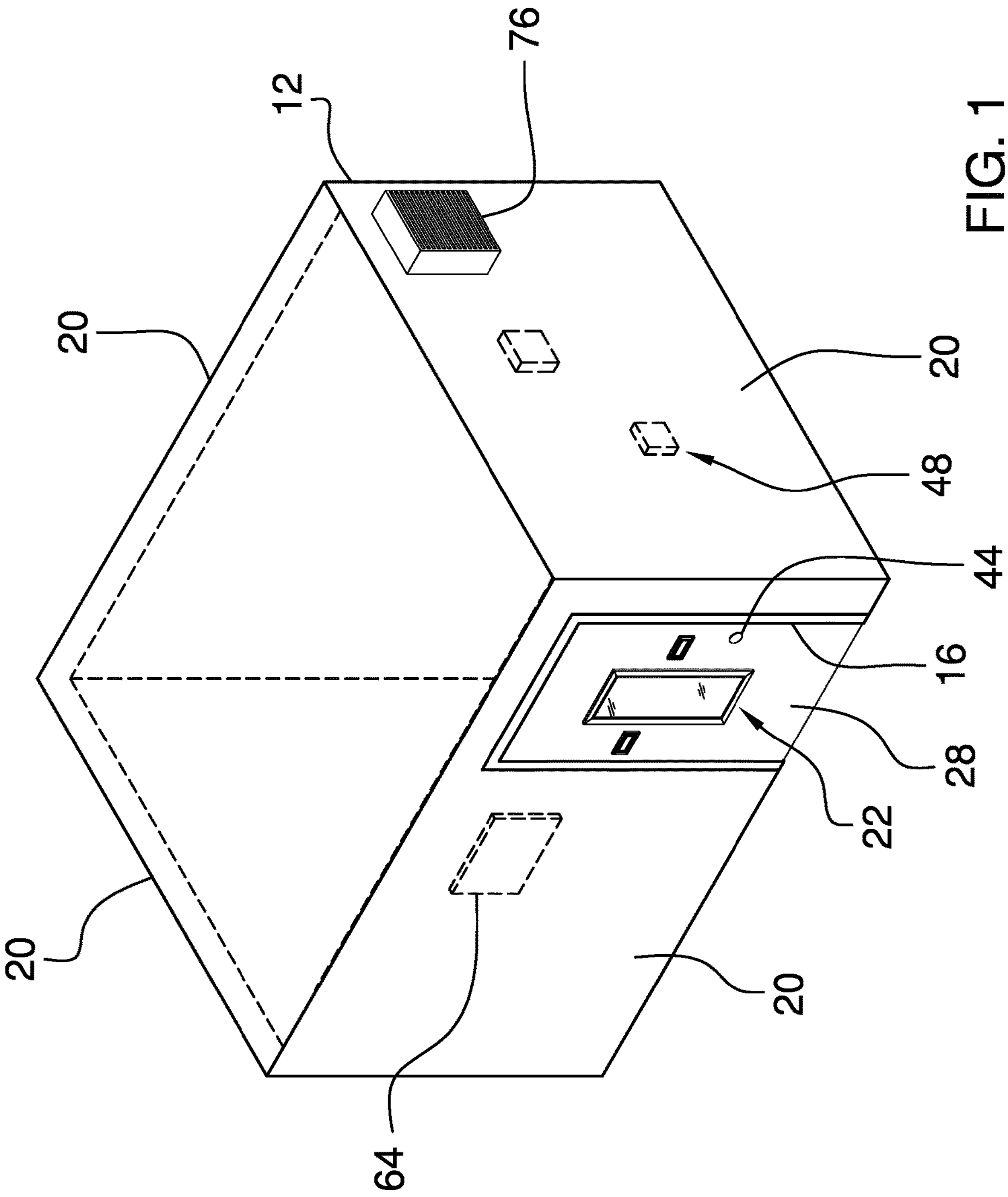
FIG. 1 is a perspective view of a safe room assembly according to an embodiment of the disclosure.
Figure 2:
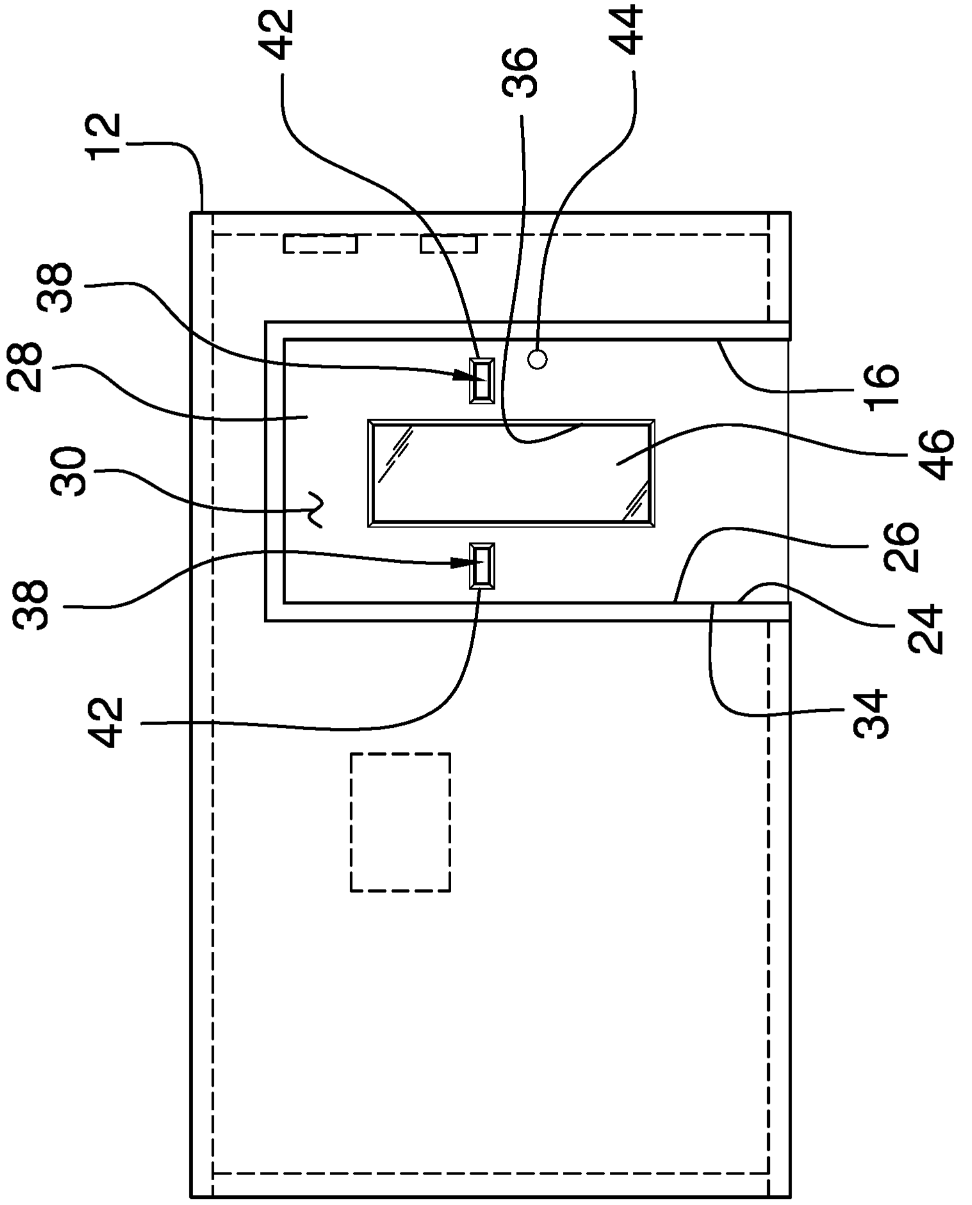
FIG. 2 is a front phantom view of an embodiment of the disclosure.
Figure 3:
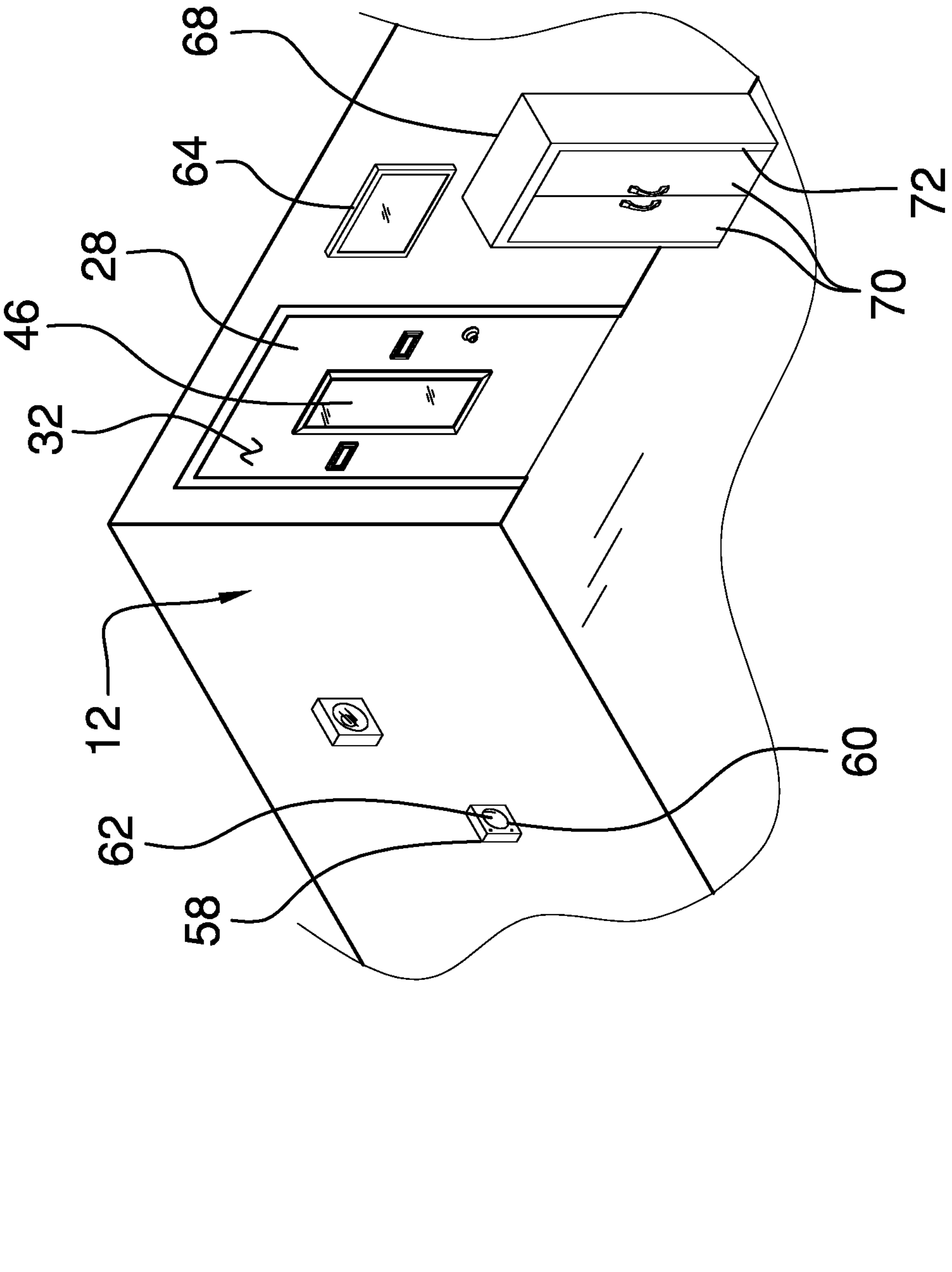
FIG. 3 is an interior perspective view of an embodiment of the disclosure.
Figure 4:
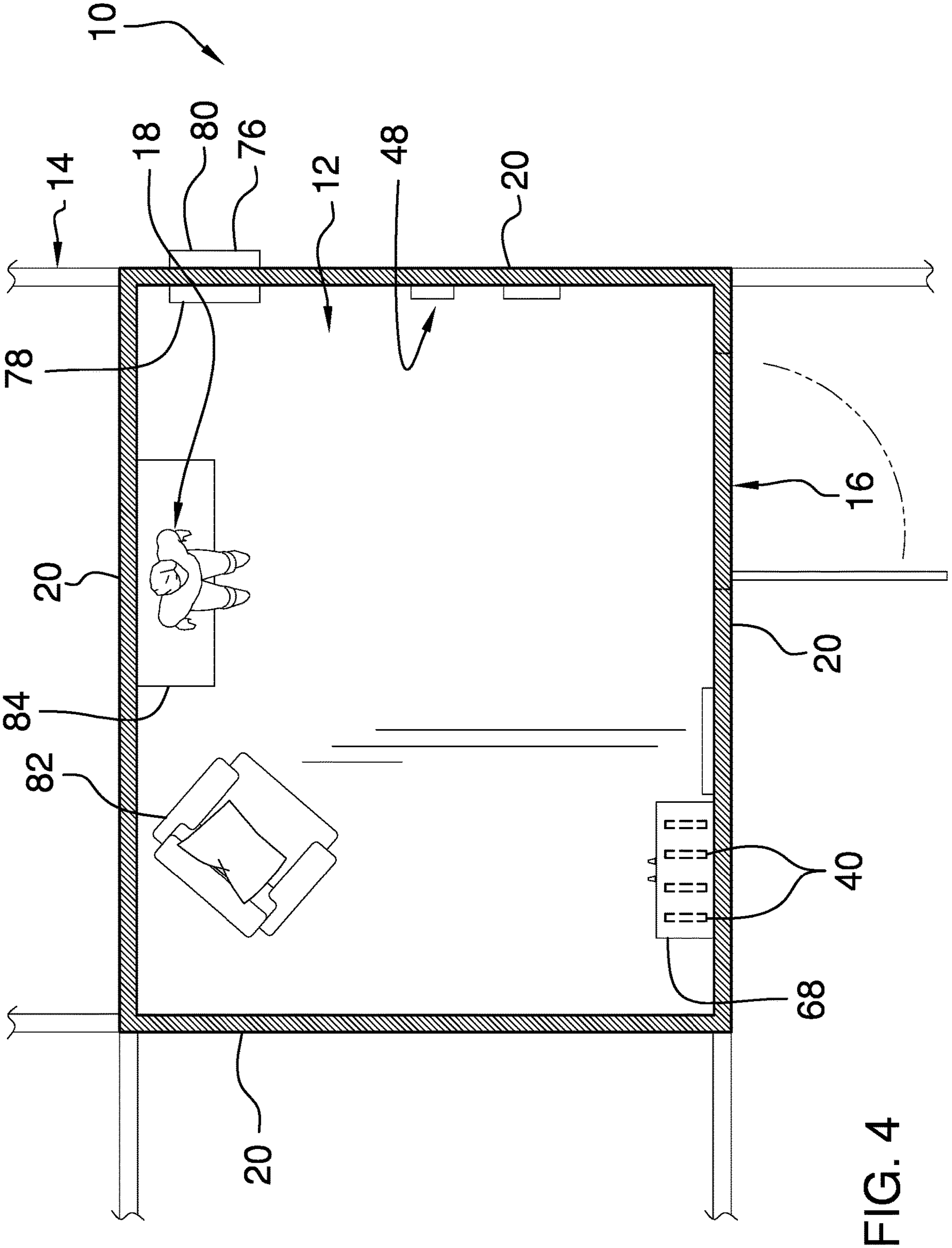
FIG. 4 is a top view of an embodiment of the disclosure.

With reference now to the drawings, and in particular to FIGS. 1 through 6 thereof, a new safe room device embodying the principles and concepts of an embodiment of the disclosure and generally designated by the reference numeral 10 will be described.

As best illustrated in FIGS. 1 through 6, the safe room assembly 10 generally comprises a room 12 in a building 14 that has an entry 16 thereby facilitating an occupant 18 to enter the room 12. The building 14 may be a house, an apartment or other type of private residence and the occupant 18 may be a person who lives at the private residence. Additionally, the building 14 may be a school, a hospital or other type of public building and the occupant 18 may be an employee that works in the public building or a patron of the public building. Each of a plurality of walls 20 of the room 12 is comprised of a bullet resistant material thereby protecting the occupant 18 from bullets fired from outside of the room 12 when the occupant 18 is in the room 12. In this way the room 12 can protect the occupant 18 from an active shooter.

The room 12 has a viewing element 22 that is integrated into the entry 16 and the viewing element 22 facilitates light to pass into the room 12. In this way the viewing element 22 facilitates the occupant 18 to see the active shooter. The viewing element 22 inhibits light from passing out of the room 12 to inhibit the active shooter from seeing the occupant 18. The entry 16 extends through a respective one of the walls 20 of the room 12 and the entry 16 has a bounding edge 24 that has a vertical side 26.

A door 28 is included that has a front surface 30, a back surface 32 and a lateral edge 34 extending between the front surface 30 and the back surface 32 and the lateral edge 34 is hingedly coupled to the vertical side 26 of the bounding edge 24 of the entry 16. The door 28 closes the entry 16 when the door 28 is closed, the door 28 exposes the entry 16 when the door 28 is opened and the door 28 is comprised of a bullet resistant material. The door 28 has a viewing opening 36 extending through the front surface 30 and the back surface 32 and the viewing opening 36 is centrally positioned on the door 28. The door 28 has a pair of defense slots 38 each extending through the front surface 30 and the back surface 32 thereby facilitating the occupant 18 to extend a weapon 40 through a respective one of the defense slots 38. In this way the defense slots 38 facilitate the occupant 18 to fire the weapon 40 toward the active shooter while the occupant 18 is inside of the room 12. Each of the defense slots 38 may comprise a unitary structure that extends through the door 28 and which includes trim 42 on each of the front surface 30 and the back surface 32 of the door 28. Additionally, each of the defense slots 38 has dimensions that are sufficient to accommodate the barrel of a firearm for example.

A lock 44 is provided and the lock 44 is integrated into the door 28. The lock 44 engages the bounding edge 24 of the entry 16 when the door 28 is closed for locking the door 28. The lock 44 is positioned on the back surface 32 of the door 28 such that the lock 44 is only accessible to the occupant 18 when the door 28 is closed. In this way the active shooter is not able to unlock the door 28 to gain access to the room 12. The lock 44 may be a deadbolt or other type of mechanical door lock that is bullet resistant. A two way mirror 46 is integrated into the viewing opening 36 in the door 28 such that the two way mirror 46 defines the viewing element 22 of the entry 16. The two way mirror 46 is comprised of a bullet resistant material to inhibit the active shooter from shooting through the two way mirror 46. Furthermore, the two way mirror 46 is oriented to pass light traveling from the back surface 32 of the door 28 toward the front surface 30 of the door 28 and to reflect light traveling toward the front surface 30 of the door 28.

A communication unit 48 is positioned within the room 12 thereby facilitating the occupant 18 to employ the communication unit 48 and the communication unit 48 includes a microphone 50 and a speaker 52. The communication unit 48 contacts emergency responders when the communication unit 48 is actuated thereby facilitating two way communications between occupant 18 and the emergency responders. Additionally, the communication unit 48 is in wired communication with an extrinsic communication network 54 thereby facilitating the communication unit 48 to place a phone call to local 911 when the communication unit 48 is actuated. The communication unit 48 is electrically coupled to a power source 56 comprising an electrical system of the building 14.

The communication unit 48 includes a housing 58 that is mounted to a respective one of the walls 20 of the room 12 such that the housing 58 is positioned within the room 12. The housing 58 has a front face 60 that is exposed with respect to the respective wall 20. Additionally, the housing 58 is positioned at a height that is sufficiently low thereby facilitating a person of average height to access the housing 58. The communication unit 48 includes an actuate button 62 that is movably integrated into the front face 60 of the housing 58 thereby facilitating the occupant 18 to depress the actuate button 62 when the occupant 18 wishes to contact the emergency responders. The communication unit 48 is actuated to place the phone call to local 911 when the actuate button 62 is depressed thereby facilitating the speaker 52 to emit the words spoken by the emergency responders and facilitating the microphone 50 to capture words spoken by the occupant 18. The speaker 52 may be an electronic speaker of any conventional design and the microphone 50 may be a microphone of any conventional design.

A display 64 is positioned in the room 12 such that the display 64 is visible to the occupant 18. The display 64 is in communication with a surveillance network 66 in the building 14 thereby facilitating the display 64 to display imagery comprising streaming video of an interior of the building 14 such that the occupant 18 can view the streaming video. The display 64 is electrically coupled to the power source 56 comprising the electrical system of the building 14. Furthermore, the display 64 may comprise an electronic display or the like and the surveillance network 66 may include closed circuit cameras or other conventional surveillance equipment.

A weapons locker 68 is positioned in the room 12 for storing weapons 40. The weapons locker 68 has a pair of doors 70 each swinging in opposing directions on a front side 72 of the weapons locker 68 for accessing an interior of the weapons locker 68. Additionally, the weapons locker 68 is positioned against a respective one of the walls 20 of the room 12. A video camera 74 may be provided and the video camera 74 may be positioned in the room 12 such that the video camera 74 records video footage of an interior of the room 12. The video camera 74 is electrically coupled to the communication unit 48 for broadcasting the video footage to the emergency responders when the communication unit 48 is actuated. Furthermore, the video camera 74 may comprise a digital video camera of any conventional design.

A ventilation unit 76 may be provided and the ventilation unit 76 may be integrated into a respective one of the walls 20 of the room 12. The ventilation unit 76 may have an intake 78 and an exhaust 80, and the ventilation unit 76 may urge air inwardly through the intake 78 and outwardly through the exhaust 80 when the ventilation unit 76 is turned on. Furthermore, the intake 78 may be directed into the interior of the room 12 and the exhaust 80 may be directed outwardly from the room 12. A chair 82 may be positioned in the room 12 thereby facilitating the occupant 18 to sit on the chair 82. A bench 84 may be positioned against a respective one of the walls of the room 12 thereby facilitating the occupant 18 to sit on the bench 84.

Figure 5:
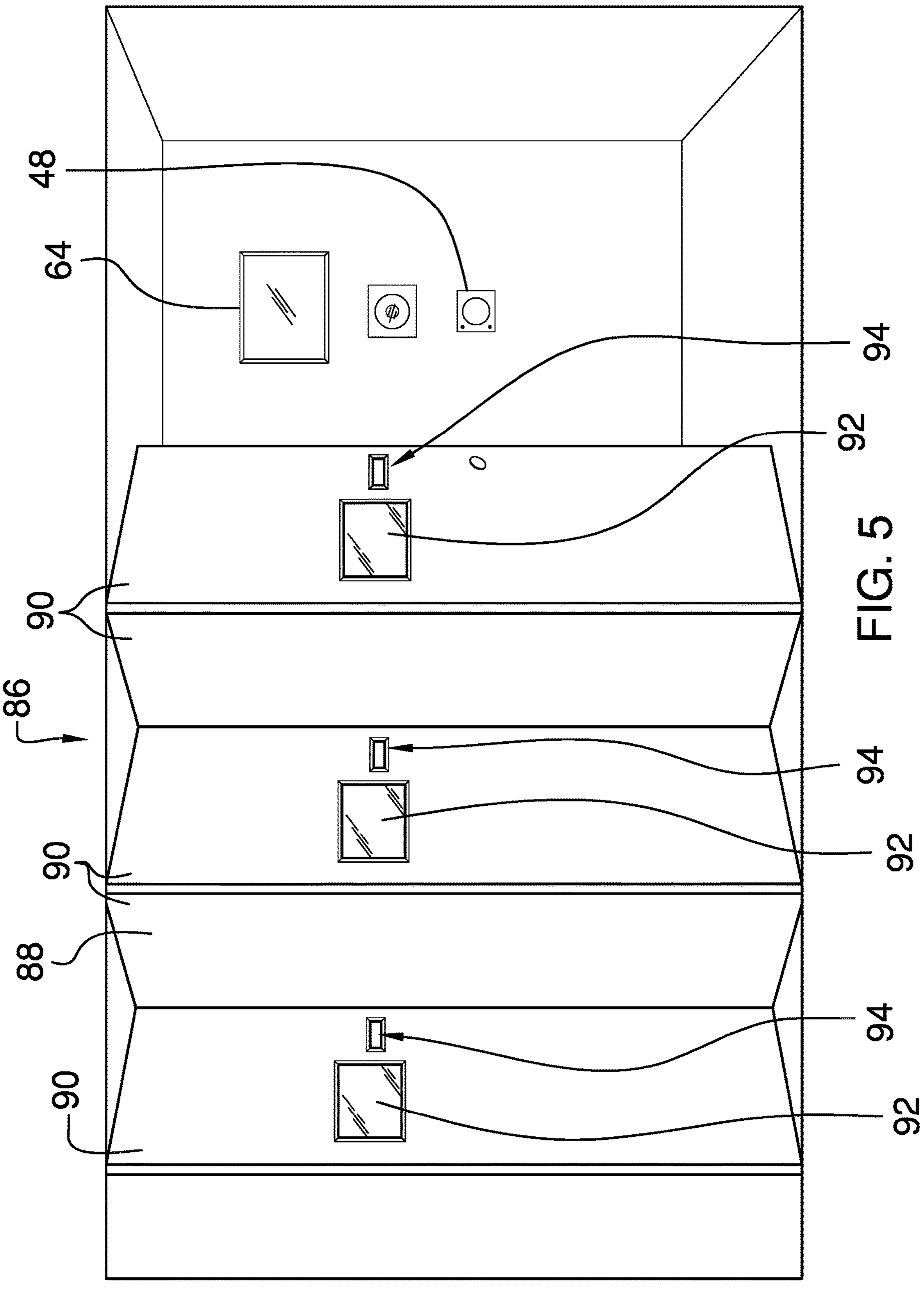
FIG. 5 is a perspective view of an alternative embodiment of the disclosure.
Figure 6:
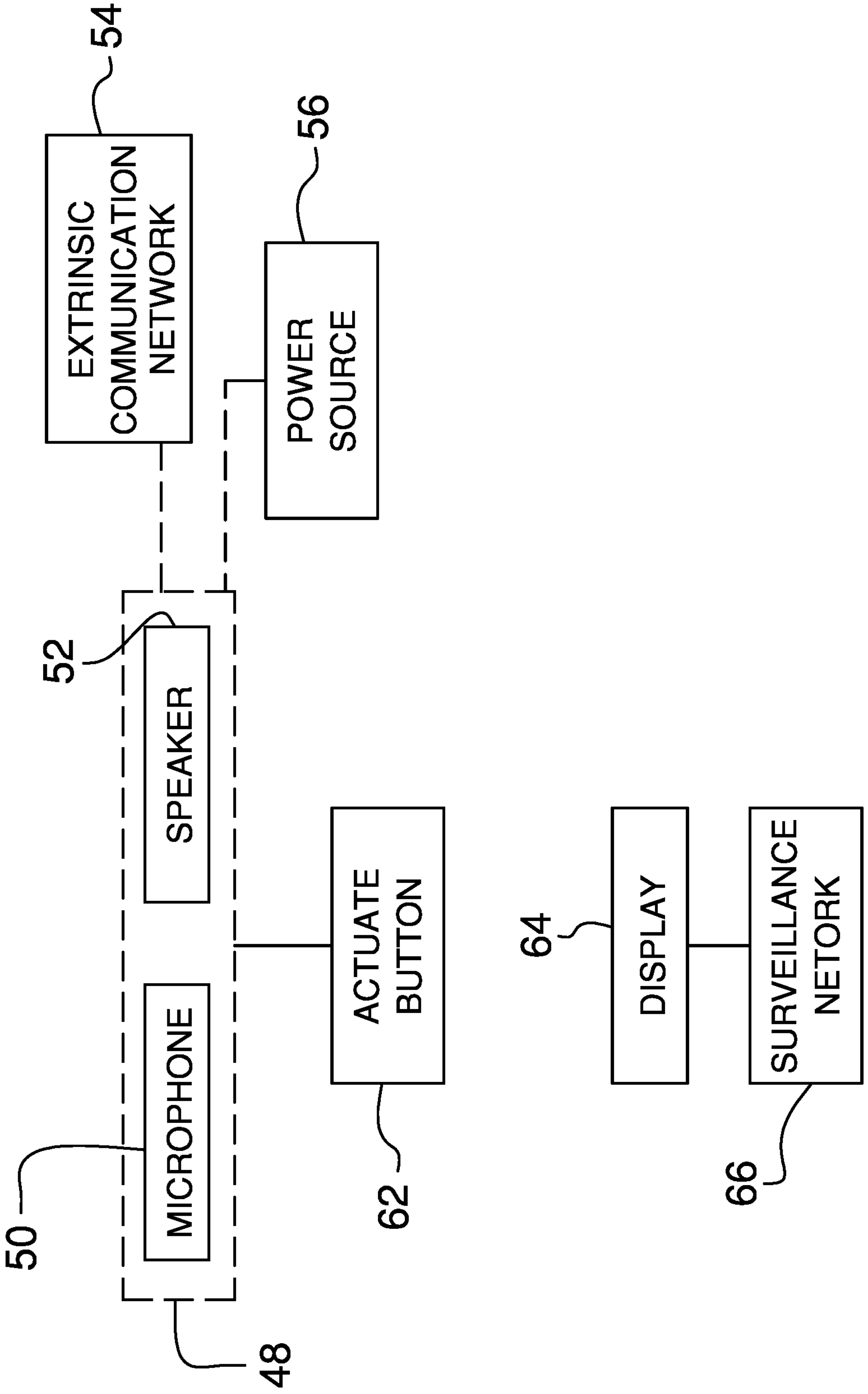
FIG. 6 is a schematic view of an embodiment of the disclosure.

In an alternative embodiment 86 as is most clearly shown in FIG. 5, a room divider 88 may be provided and the room divider 88 may be positioned in the room 12. The room divider 88 may comprise a plurality of hinged panels 90 that are each comprised of a bullet resistant material. The room divider 88 may include a plurality of two-way mirrors 92 that are each integrated into a respective one of the hinged panels 90. Additionally, the room divider 88 may include a plurality of defensive slots 94 each integrated into a respective one of the hinged panels 92. The room divider 88 can be positioned in various locations within the room 12 such that the occupant 18 can have protection from the active shooter in the unlikely scenario that the active shooter gains access to the room 12.

In use, the occupant 18 retreats into the room 12 and locks the door 28 whenever the occupant 18 is under any kind of threat, including but not being limited to the presence of an active shooter. In this way the occupant 18 can be protected from harm that could result from a variety of different causes. The occupant 18 depresses the actuate button 62 when the occupant 18 wishes to contact police to request assistance. Furthermore, the occupant 18 can retrieve a weapon 40 from the weapons locker 68 and the occupant 18 can fire the weapon 40 through a respective one of the defense slots 28 in the door 28 to return fire at the active shooter. The two-way mirror facilitates the occupant 18 to have a clear view of the hallway approaching the door 28, for example, or other area of the interior of the building 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A safe room assembly facilitating an occupant to be protected from bullets from firearms and other forms of attack, said assembly comprising:

a room in a building having an entry thereby facilitating the occupant to enter said room, each of a plurality of walls of said room being comprised of a bullet resistant material thereby protecting the occupant from bullets fired from outside of said room when the occupant is in said room wherein said room is configured to protect the occupant from an active shooter, said room having a viewing element being integrated into said entry, said viewing element facilitating light to pass into said room wherein said viewing element is configured facilitate the occupant to see the active shooter, said viewing element inhibiting light from passing out of said room wherein said viewing element is configured to inhibit the active shooter from seeing the occupant;

a communication unit being positioned within said room thereby facilitating the occupant to employ said communication unit, said communication unit including a microphone and a speaker, said communication unit contacting emergency responders when said communication unit is actuated thereby facilitating two way communication between occupant and the emergency responders, said communication unit being in wired communication with an extrinsic communication network thereby facilitating said communication unit to place a phone call to local 911 when said communication unit is actuated;

a display being positioned in said room such that said display is visible to the occupant, said display being in communication with a surveillance network in said building thereby facilitating said display to display imagery comprising streaming video of an interior of said building s that the occupant can view the streaming video; and a weapons locker being positioned in said room for storing weapons;

wherein said entry extends through a respective one of said walls of said room, said entry having a bounding edge having a vertical side;

wherein said assembly includes a door having a front surface, a back surface and a lateral edge extending between said front surface and said back surface, said lateral edge being hingedly coupled to said vertical side of said bounding edge of said entry, said door closing said entry when said door is closed, said door exposing said entry when said door is opened, said door being comprised of a bullet resistant material;

wherein said door has a viewing opening extending through said front surface and said back surface, said viewing opening being centrally positioned on said door, said viewing opening being elongated between a top and a bottom of said viewing opening; and wherein said door has a pair of defense slots each extending through said front surface and said back surface thereby facilitating the occupant to extend a weapon through a respective one of said defense slots wherein said defense slots are configured to facilitate the occupant to fire the weapon toward the active shooter, each of said slots being positioned laterally from a respective longitudinal side of said viewing opening.

2. The assembly according to claim 1, further comprising a lock being integrated into said door, said lock engaging said bounding edge of said entry when said door is closed for locking said door, said lock being positioned on said back surface of said door such that said lock is only accessible to the occupant when said door is closed.

3. The assembly according to claim 1, further comprising a two way mirror being integrated into said viewing opening in said door such that said two way mirror defines said viewing element of said entry, said two way mirror being comprised of a bullet resistant material wherein said two way mirror is configured to inhibit the active shooter from shooting through said two way mirror, said two way mirror being oriented to pass light traveling from said back surface of said door toward said front surface of said door, said two way mirror being oriented to reflect light traveling toward said front surface of said door.

4. The assembly according to claim 1, wherein said communication unit is electrically coupled to a power source comprising an electrical system of said building, said communication unit including:

a housing being mounted to a respective one of said walls of said room such that said housing is positioned within said room, said housing having a front face being exposed with respect to said respective wall, said housing being positioned at a height being sufficiently low thereby facilitating a person of average height to access said housing; and an actuate button being movably integrated into said front face of said housing thereby facilitating the occupant to depress said actuate button when the occupant wishes to contact the emergency responders, said communication unit being actuated to place the phone call to local 911 when said actuate button is depressed thereby facilitating said speaker to emit the words spoken by the emergency responders and facilitating said microphone to capture words spoken by the occupant.

5. The assembly according to claim 1, wherein said weapons locker has a pair of doors each swinging in opposing directions on a front side of said weapons locker for accessing an interior of said weapons locker, said weapons locker being positioned against a respective one of said walls of said room.

6. A safe room assembly facilitating an occupant to be protected from bullets from firearms and other forms of attack, said assembly comprising:

a room in a building having an entry thereby facilitating the occupant to enter said room, each of a plurality of walls of said room being comprised of a bullet resistant material thereby protecting the occupant from bullets fired from outside of said room when the occupant is in said room wherein said room is configured to protect the occupant from an active shooter, said room having a viewing element being integrated into said entry, said viewing element facilitating light to pass into said room wherein said viewing element is configured facilitate the occupant to see the active shooter, said viewing element inhibiting light from passing out of said room wherein said viewing element is configured to inhibit the active shooter from seeing the occupant, said entry extending through a respective one of said walls of said room, said entry having a bounding edge having a vertical side;

a door having a front surface, a back surface and a lateral edge extending between said front surface and said back surface, said lateral edge being hingedly coupled to said vertical side of said bounding edge of said entry, said door closing said entry when said door is closed, said door exposing said entry when said door is opened, said door being comprised of a bullet resistant material, said door having a viewing opening extending through said front surface and said back surface, said viewing opening being centrally, positioned on said door, said viewing opening being elongated between a top and a bottom of said viewing opening, said door having a pair of defense slots each extending through said front surface and said back surface thereby facilitating the occupant to extend a weapon through a respective one of said defense slots wherein said defense slots are configured to facilitate the occupant to fire the weapon toward the active shooter, each of said slots being positioned laterally from a respective longitudinal side of said viewing opening;

a lock being integrated into said door, said lock engaging said bounding edge of said entry when said door is closed for locking said door, said lock being positioned on said back surface of said door such that said lock is only accessible to the occupant when said door is closed;

a two way mirror being integrated into said viewing opening in said door such that said two way mirror defines said viewing element of said entry, said two way mirror being comprised of a bullet resistant material wherein said two way mirror is configured to inhibit the active shooter from shooting through said two way mirror, said two way mirror being oriented to pass light traveling from said back surface of said door toward said front surface of said door, said two way mirror being oriented to reflect light traveling toward said front surface of said door;

a communication unit being positioned within said room thereby facilitating the occupant to employ said communication unit, said communication unit including a microphone and a speaker, said communication unit contacting emergency responders when said communication unit is actuated thereby facilitating two way communication between occupant and the emergency responders, said communication unit being in wired communication with an extrinsic communication network thereby facilitating said communication unit to place a phone call to local 911 when said communication unit is actuated, said communication unit being electrically coupled to a power source comprising an electrical system of said building, said communication unit including:

a housing being mounted to a respective one of said walls of said room such that said housing is positioned within said room, said housing having a front face being exposed with respect to said respective wall, said housing being positioned at a height being sufficiently low thereby facilitating a person of average height to access said housing; and an actuate button being movably integrated into said front face of said housing thereby facilitating the occupant to depress said actuate button when the occupant wishes to contact the emergency responders, said communication unit being actuated to place the phone call to local 911 when said actuate button is depressed thereby facilitating said speaker to emit the words spoken by the emergency responders and facilitating said microphone to capture words spoken by the occupant;

a display being positioned in said room such that said display is visible to the occupant, said display being in communication with a surveillance network in said building thereby facilitating said display to display imagery comprising streaming video of an interior of said building such that the occupant can view the streaming video, said display being electrically coupled to said power source comprising said electrical system of said building; and a weapons locker being positioned in said room for storing weapons, said weapons locker having a pair of doors each swinging in opposing directions on a front side of said weapons locker for accessing an interior of said weapons locker, said weapons locker being positioned against a respective one of said walls of said room.

7. The assembly according to claim 6, further comprising a video camera being positioned in said room such that said video camera records video footage of an interior of said room, said video camera being electrically coupled to said communication unit for broadcasting the video footage to the emergency responders when said communication unit is actuated.

8. The assembly according to claim 6, further comprising a ventilation unit being integrated into a respective one of said walls of said room, said ventilation unit having an intake and an exhaust, said ventilation unit urging air inwardly through said intake and outwardly through said exhaust when said ventilation unit is turned on, said intake being directed into said interior of said room, said exhaust being directed outwardly from said room.

9. The assembly according to claim 6, further comprising:
- a chair being positioned in said room thereby facilitating the occupant to sit on said chair; and
- a bench being positioned against a respective one of said walls of said room thereby facilitating the occupant to sit on said bench.

* * * * *